United States Patent [19]
McKeown et al.

[11] Patent Number: 5,660,852
[45] Date of Patent: Aug. 26, 1997

[54] COMPOSITION FOR THE TREATMENT OR PREVENTION OF AN ENERGY IMBALANCE IN RUMINANTS

[75] Inventors: Neil A. McKeown, New Hamburg, Canada; Richard S. Patton, Galisteo, N. Mex.

[73] Assignee: Don J. Pestell Limited, Canada

[21] Appl. No.: 527,494

[22] Filed: Sep. 13, 1995

[30] Foreign Application Priority Data

Sep. 13, 1994 [GB] United Kingdom ............... 9418420

[51] Int. Cl.$^6$ .................. A23K 1/18; A61K 35/68
[52] U.S. Cl. ............................ 424/438; 426/623
[58] Field of Search ............................ 424/442, 438

[56] References Cited

U.S. PATENT DOCUMENTS

| | | | |
|---|---|---|---|
| 3,541,217 | 11/1970 | Marshall et al. | 514/632 |
| 3,928,576 | 12/1975 | Yoshida | 424/154 |
| 3,959,493 | 5/1976 | Baalsrud et al. | 426/2 |
| 4,223,045 | 9/1980 | Fink | 426/335 |
| 4,542,031 | 9/1985 | Nakajima et al. | 426/307 |
| 4,642,317 | 2/1987 | Palmquist et al. | 514/558 |
| 4,680,315 | 7/1987 | Bezzegh et al. | 514/738 |
| 5,001,143 | 3/1991 | Hokazono et al. | 514/30 |
| 5,087,472 | 2/1992 | Nissen | 426/623 |
| 5,182,126 | 1/1993 | Vinci et al. | 426/601 |
| 5,194,448 | 3/1993 | Coupland et al. | 514/558 |
| 5,250,714 | 10/1993 | Lajoie | 554/156 |
| 5,494,670 | 2/1996 | Wilkinson | 424/198.1 |

FOREIGN PATENT DOCUMENTS

| | | |
|---|---|---|
| 781885 | 4/1968 | Canada . |
| 871640 | 5/1971 | Canada . |
| 1101263 | 5/1981 | Canada . |
| 1270690 | 6/1990 | Canada . |
| 2051422 | 3/1991 | Canada . |
| 2557884 | 7/1985 | France . |
| 2931617 | 2/1981 | Germany . |
| 4212175 | 10/1992 | Germany . |
| 46016915b | 5/1971 | Japan . |
| 2102268 | 5/1982 | United Kingdom . |
| 2153670 | 1/1985 | United Kingdom . |

OTHER PUBLICATIONS

Emmett N. Bergman —Disorders of Carbohydrate and Fat Metabolism —pp. 357–363.
I. J. Lean, M. L. Bruss, R. L. Baldwin, H. F. Troutt —Bovine Ketosis: A Review. I. Epidemiology and Pathogenesis —Veterinary Bulletin 1991 vol. 61, No. 12.
D. S. Kronfeld —Spontaneous Bovine Ketosis —Modern Veterinary Practice August, 1970, pp. 30–34.
R.A. Frobish and C. L. Davis —Effects of Abomasal Infusions of Glucose Propionate on Milk Yield and Composition —Journal of Dairy Science vol. 60, No. , pp. 204–209.

(List continued on next page.)

*Primary Examiner*—Peter F. Kulkosky
*Attorney, Agent, or Firm*—Dale F. Schlosser

[57] ABSTRACT

A feed supplement for ruminants comprising a gluconeogenic compound, which can be digested in the rumen and a hydrogenated fatty acid, which is rumen inert, is described. One example of such a feed supplement comprises 30% gluconeogenic compounds, by weight and 30% $C_{14}$–$C_{22}$ hydrogenated fatty acids by weight, the balance being essentially inert compounds. The feed supplement of the present invention can be used in the treatment of or for the prevention of negative energy or a nutrient imbalance. A method of treating or preventing a nutrient imbalance by administering to a ruminant in need thereof, a daily dosage amount of a composition comprising a gluconeogenic compound, which can be digested in the rumen and a hydrogenated fatty acid, which is rumen inert, for from 10–21 days prior to calving to 21–42 days after calving.

18 Claims, 1 Drawing Sheet

OTHER PUBLICATIONS

J.C. Bartley and A. L. Black —Effect of Exogenous Glucose on Glucose Metabolism in Dairy Cows —J. Nutrition, 89: '66, pp. 317–328.

T. Richard Houpt —Stimulation of Food Intake in Ruminants by 2–deoxy–D–Glucose and Insulin —American Journal of Physiology, vol. 227, No. 1, Jul. 1974, pp. 161–167.

David A. Marshall, Richard L. Doty —Taste Responses of Dogs to Ethylene Glycol, Propylene Glycol and Ethylene Glycol–based Antifreeze —Javma, vol. 197, No. 12, Dec. 15, 1990, pp. 1599–1602.

David C. Dorman, Wanda M. Haschek —Fatal Propylene Glycol Toxicosis In a Horse —Javma, vol. 198, No. 9, May 1, 1991, pp. 1643–1644.

L. J. Fisher, J. D. Erfle, G. A. Lodge and F. D. Sauer —Effects of Propylene Glycol or Glycerol. Supplementation of the Diet of Diary Cows on Feed Intake, Milk Yield and Composition and Incidence of Ketosis —Canadian Journal of Animal Science, vol. 53, Jun. 1973, pp. 289–296.

D. C. Maplesden —Propylene Glycol In the Treatment of Ketosis —Canadian Journal of Comparative Medicine, vol. XVIII, No. 8 Aug., 1954, pp. 287–293.

R. S. Emery, Nancy Burg, L. D. Brown, G. N. Blank —Detection, Occurrence and Prophylactic Treatment of Borderline Ketosis with Propylene Glycol Feeding —Journal Article No. 3411 from the Michigan Agricultural Experiment Station, 1964, pp. 1074–1079.

P. J. Hanzlik, A. J. Lehman, W. Van Winkle, Jr. and N. K. Kennedy —General Metabolic and Glycogenic Actions of Propylene Glycol and Some Other Glycols —Mar. 14, 1939, pp. 114–126.

A. H. Andrews —Effects of glycose and Propylene Glucol on Pregnancy Toxaemia In Ewes —The Veterinary Record, Jan. 23, 1982.

P. J. Hanzlik, h. W. Newman, W. Van Winkle, Jr. A. J. Lehman, N. K. Kennedy —Toxicity, Fats and Excretion of Propylene Glycol and Some Other Glycoles —Mar. 8, 1939, pp. 101–113.

P. W. Waldroup, T. E. Bowen —Evaluation of Propylene Glycol as an Energy Source in Broiler Diets Apr. 15, 1968, pp. 1911–1917.

P. Ferré, J. P. Pegorier, E. B. Marliss, Jr. r. Girar —Influence of Exogenous Fat and Gluconeogenic Substrates on Glucose Homeostasis in the Newborn Rat —Mar. 11 1977, pp. E129–E136.

D. S. Kronfeld —Homeostatic Disorders Associated with Lactation —pp. 537–592.

Dr. L. H. Schultz —Relationship of Feeding to Ketosis in Dairy Cattle —Feedstuffs, Oct. 31, 1959.

D. R. Waldo, L. H. Schultz —Blood and Rumen Changes following the Intra–Ruminal Adminstration of Glycogenic Materials —Dec. 4, 1959, pp. 496–505.

G. J. Ruegsegger, L. H. Schultz —Use of a Combination of Propylene Glycol and Niacin for Subclinical Ketosis —Journal of Dairy Science vol. 69, No. 5, 1986, pp. 1411–1415.

G. S. Dufva, E. E. Barley, A. D. Dayton, D. O. Riddell —Effect of Niacin Supplementation on Milk Production and Ketosis of Dairy Cattle —Journal of Dairy Science vol. 66, No. 11, 1983, pp. 2329–2336.

Vaughn A. Studer, Ric R. Grummer, Sandra J. Bertics, Christopher K. Reynolds Effect of Prepartum Propylene Glycol Administration of Periperturient Fatty Liver in Diary Cows —Journal of Dairy Science vol. 76, No. 10, 1993, pp. 2931–2939.

G. David Baird, Michael A. Lomax, Herbert W. Symonds, Stephen R. Shaw —Net Hepatic and Splanchnic Metabolism of Lactate, Pyruvate and Propionate in Dairy Cows in vivo in Relation to Lactation and Nutrient Supply —Biochem Journal, Great Britain, 1980, vol. 186, pp. 47–57.

C. Rémésy, C. Demigné—Availability of Glucogenic Precursors and Ketogenesis in Pregnant Ewes —pp. 63–68.

L. J. Fisher, J. D. Erfle, F. D. Sauer —Preliminary Evaluation of the Addition of Glucogenic Materials to the Rations of Lactating Cows —Canadian Journal of Animal Science, vol. 51, Dec. 1971, pp. 721–727.

Robert B. Johnson —The Treatment of Ketosis with Glycerol and Propylene Glycol —Jul. 15, 1952, pp. 6–21.

F. D. Sauer, J. D. Erfle, L. J. Fisher —Propylene Glycol and Glycerol as a Feed Additive for Lactating Dairy Cows: An Evaluation of Blood Metabolite Parameters —Canadian Journal of Animal Science, vol. 53 Jun. 1973, pp. 265–271.

Paavo Miettinen —Propylene Glycol in Prevention of Bovine Ketosis —Acta vet. scan. Suppl. 89 —1993, pp. 135–136.

G. H. Schmidt, L. H. Schultz —Effect of Feeding Sodium Propionate on Milk and Fat Production, Roughage Consumption, Blood Sugar and Blood Ketones of Dairy Cows —Feb., 1956, pp. 169–175.

L. H. Schultz —Use of Sodium Propionate in the Prevention of Ketosis in Dairy Cattle —Jul. 12, 1957, pp. 160–168.

Kronfeld and Chalupa, Sklan —Ketosis, Lactational Efficiency and Feeding Fat —Animal Nutrition & Health, Nov.–Dec., 1983, pp. 28–33.

Kauko Kauppinen, Yrjó Gröhn —Treatment of Bovine Ketosis with Invert Sugar, Glucocorticoids and Propylene Glycol —Acat vet. Scand. 1984, vol. 25, pp. 467–479.

R. R. Grummer, D. J. Carroll —Effects of Dietary Fat on Metabolic Disorders and Reproductive Performance of Dairy Cattle —Journal of Animal Science 1991, vol. 69, pp. 3838–3852.

A. Wierda, J. Verhoeff, S. van Dijk, J. Dorresteijn, T. Wensing —Effects of Trenbolone Acetate and Propylene Glycol on Pregnancy Toxaemia In Ewes —The Veterinary Record, Mar. 16, 1985, vol. 116, pp. 284–287.

A. Wierda, J. Verhoeff, J. Dorresteijn, T. Wensing, S. van Dijk —Effects of Two Glucocorticoids on Milk Yield and Biochemical Measurements in Healthy and Ketotic Cows —Veterinary Record 1987, vol. 120, pp. 297–299.

D. Michael Rings —Therapeutic Considerations in Ketosis and Hepatic Lipidosis in Cattle —Modern Veterinary Practice, Food Animal Aug. 1985, pp. 523–526.

J. F. Cote —Bovine Ketosis: Principles of Therapy —Canadian Veterinary Journal, Jan. 1971, vol. 12, No. 1, pp. 19–20.

F. H. Fox —Clinical Diagnosis and Treatment of Ketosis —Journal of Dairy Science, vol. 54, No. 6, pp. 974–978.

Prof. Dr. David S. Kronfeld, Prof. Dr. Kraft Drepper —Ketosis in High–Yielding Dairy Cows —Verlag Paul Parey 1976, pp. 5–26, Bruce F. Jenny, Carl E. Polan, Forrest W. Thye —Effects of High Grain Feeding and Stage of Lactation on Serum Insulin, Glucose and Milk Fat Percentage in Lactating Cows —Jul. 3, 1973, pp. 379–385.

C. Björkman, K. Forslund, P. Holtenius, G. Olsson, H. Wiktorrson —A Comparative Study of Arterial and Venous Blood Acetate Concentration In Cows Fed Different Diets Close to Parturition —Journal of Vet. Medicine, 1992, vol. A 39, pp. 548–552.

L. H. Schultz —Management and Nutritional Aspects of Ketosis —Journal of Dairy Science, vol. 54, No. 6, pp. 962–973.

Dr. Harold Radloff —Proper Transition Feeding Reduces Metabolic Disorders —The Dairyman, Oct. 1993, pp. 25–27.

K. G. Hibbitt —Bovine Ketosis and Its Prevention —Veterinary Record, 1979, vol. 15, pp. 13–15.

Michael A. Lomax, Iain A. Donaldson, Christopher I. Pogson —The Effect of Fatty Acids and Starvation on the Metabolism of Gluconeogenic Precursors by Isolated Sheep Liver Cells —Biochem. J., Great britain, 1986, vol. 240, pp. 277–280.

R. J. Aiello, L. E. Armentano —Fatty Acid Effects on Gluconeogenesis in Goat, Calf and Guinea Pig Hepatocytes —Comp. Biochem. Physiol., Great Britain, 1988, vol. 91B, No. 2, pp. 339–344.

Anne Faulkner, Helen T. Pollock —Propionate Metabolism and its Regulation by Fatty Acids in Ovine Hepatocytes —Comp. Biochem. Physiol., Great Britain, 1986, vol. 84B, No. 4, pp. 559–563.

R. J. Aiello, L. E. Armentano —Gluconeogenesis in Goat Hepatocytes is Affected by Calcium, Ammonia and Other Key Metabolites but not Primarily Through Cytosolic Redox State —Comp. Biochem. Physiol., 1987, vol. 88B, No. 1, pp. 193–201.

H. A. Lomay, I. A. Donaldson, C. I. Pogson —Antiketonic Action of Gluconeogenic Precursors in Sheep Hepatocytes —pp. 129–132.

COMPOSITION FOR THE TREATMENT OR PREVENTION OF AN ENERGY IMBALANCE IN RUMINANTS

FIELD OF THE INVENTION

This invention relates to a composition for the treatment or prevention of an energy imbalance in ruminants and a method of treating an energy imbalance in ruminants.

BACKGROUND OF THE INVENTION

In modern animal agriculture, genetic selection for intense production have created animals that produce food for mankind at a rate beyond the capabilities of their traditional metabolic machinery's capacity. This is particularly true during the time around parturition, when exponential fetal growth, compromised gut fill capacity, and pending lactation demands combine to create an energy shortage. This nutritional energy stress and related shortage is evidenced as various disease states in many species, for example, ketosis and retained placenta in cattle.

Ketosis is a metabolic disease that usually occurs in early lactation and is characterized by elevated levels of ketone bodies in the body fluids. Clinical signs include reduced appetite, reduced milk production, reduced carbohydrate status, weight loss and hypoglycaemia. Since the time when the disease was first diagnosed, it has been assumed that the underlying cause of ketosis was the shortage of glucose supply relative to demand. Researchers, however, have questioned the accuracy of the glucose shortage theory. Schultz, L. H. and Smith, V. R. note that a deficiency of blood glucose alone does not appear sufficient to cause ketosis in ruminants (J. Dairy Sci., Vol.34, (1951), p.1190). Shaw, J. C. notes that theories on the etiology of ketosis do not explain how a cow can be hypoglycaemic in early lactation without being ketotic (J. Dairy Sci., Vol.39 (1956), p.402).

The glucose shortage theory proposes that the mammary gland of the ruminant has a high degree of precedence in its demand for glucose. The mammary gland can deplete blood glucose and hepatic precursors of glucose. This results in gluconeogenesis, i.e. the metabolic formation of glucose from gluconeogenic compounds such as propionate, and this high mammary demand also leads to the release of free fatty acids (FFA), also referred to as non-esterified fatty acids (NEFA), from the adipose tissue. The liver is unable to completely oxidize all the NEFA entering it and hepatic ketogenesis occurs.

A different view of the cause of ketosis has been presented by D. S. Kronfeld (Kronfeld, D. S. "Homeostatic Disorders Associated With Lactation", *Bovine Medicine and Surgery*, Chpt.11, pp.539–565). This theory postulates that spontaneous ketosis is due to an insufficiency of lipogenic nutrients relative to glucose.

This competing theory espoused by Kronfeld postulates that there is actually too much glucose in relation to lipogenic substances in the blood and the mammary gland calls for the release of NEFA from the adipose tissue.

The treatment of ketosis has primarily relied on increasing the quantity of glucose available for utilization by the ruminant's tissues. This has been accomplished by providing the liver with gluconeogenic compounds or by directly infusing glucose into the blood stream. Glucose therapy, however, has not shown itself to be the only therapy needed. Frustration with glucose therapy has been the main reason for trying other treatments. The administration of glucose precursors such as sodium propionate, lactate, glycerol or propylene glycol is followed by less dramatic and consistent improvement than is expected from glucose. The glucose precursors or gluconeogenic compounds are then processed into glucose by the liver. These treatments have been useful only therapeutically and not in all cases. Consequently, glucose precursors are not viewed as sole or primary therapy for mild or severe cases. Usually, the cow will often correct its own energy imbalance eventually by reducing milk output.

It has been proposed, as an alternative to the glucose shortage concept, that ketosis in cattle develops when there is an excess of gluconeogenic nutrients in the ration relative to the lipogenic nutrients. The fat precursors can either be supplied directly from the diet or from body stores. If the lipogenic substances are mobilized from body stores, ketosis may develop. Therefore, it has been proposed by Kronfeld and Chalupa that in order to prevent ketosis, fatty acids of a chain length of 14 or more carbons should be included in the diet, thus, preventing the need to mobilize depot fat (Animal Nutrition and Health, November–December 1983 p.28). Long chain fatty acids mobilized from fat stores are present as free fatty acids in the blood which are extracted by the liver and are highly ketogenic. In contrast, long chain fatty acids that bypass the rumen are absorbed from the small intestine into the lymph in the form of chylomicrons. These are not extracted by the liver and are not ketogenic in ruminants. Therefore, it has been proposed that the kinds of fats that should be fed to prevent ketosis should have fatty acids of a chain length of 14 or more carbons and should be inert to the rumen.

Although fat is a well recognized storage form of energy, animals can not make glucose from fat. The energy precursors derived from fat breakdown can only be processed to energy when carbohydrate degradation is happening in a parallel and balanced manner. If fat degradation predominates over carbohydrate availability, the fat breakdown entities undergo a different fate, specifically, to ketone bodies.

The Krebs Cycle or citric acid cycle in mammals is the common final pathway for the oxidation of molecules such as amino acids, fatty acids and carbohydrates. Fatty acids are oxidized to acetyl CoA (AcCoA). The two carbon acetyl CoA enters the citric acid cycle only if there is sufficient oxaloacetate (OAA), a four carbon molecule. OAA and AcCoA combine to form citrate, a six carbon acid that is enzymatically passed around the Krebs Cycle, finally regenerating OAA and energy. OAA is not formed in the process, only regenerated, thus its availability is rate limiting for the amount of energy derived from the citric acid cycle. OAA is also used for glucose production from other glucose precursors such as amino acids.

At the time of parturition many systems have dramatically increased energy need. The organism's response is to mobilize body stores of fat. But, mammals cannot convert acetyl CoA into pyruvate or OAA. To obtain energy from fat, this fat typically goes to the liver for processing. With only limited OAA, the sudden influx of mobilized fatty acid metabolites overwhelms the supply of OAA and ketones are produced as an emergency solution. This situation is greatly exacerbated by the fact that OAA also is an obligate intermediate for gluconeogenesis, so an already compromised OAA pool is still further lessened by the driving need for glucose. There simply just isn't enough OAA to process mobilized fat and support glucose synthesis.

The metabolic condition of the parturient cow is summarized below:

1. An overall energy (glucose) deficit has caused the liver to maximize glucose synthesis from all available precursors via the process of glycogenesis.
2. This same energy deficit has elicited the release of stored energy from body reserves, resulting in a high mobilization of fatty acid.
3. Ruminants can not make glucose from this mobilized fat; it only represents an aid in the energy crisis because it can be oxidized for ATP, the same ultimate contribution of glucose.
4. The liver has two critical functions pertinent to the energy crisis; make glucose for tissue consumption and process AcCoA from fatty acid oxidation for energy.
5. Oxaloacetate (OAA) is an essential component for the execution of both of the needed functions of the liver in this energy crisis.
6. The liver preferentially uses OAA for glucose production driven by the high and immediate need for glucose by the conceptus mass, birthing, and pending lactation.
7. The diversion of OAA to gluconeogenesis compromises the citric acid cycle, which also needs OAA to function.
8. In the absence of OAA, what AcCoA enters the liver mitochondria citric acid cycle is processed into ketone bodies. While many tissues can eventually utilize ketones for energy, this requires a 48 to 72 hour adaptation period, and before this time, the accumulated ketones and energy shortage induce a malaise that depresses appetite.
9. Depressed appetite further complicates the energy crisis, and a downward spiral ensues.

Microbial fermentation of a ruminant's feedstuff occurs in the rumen. Further digestion occurs in the abomasum. U.S. Pat. No. 5,182,126 to Vinci et al. discloses a feed supplement which contains a $C_{14}$–$C_{22}$ fatty acid alkaline earth metal salt and a biologically active ingredient which functions as a rumen bypass animal feed supplement and increases dietary fat in the feed. A feed additive such as a fatty acid alkaline earth metal salt functions as a rumen inert product which passes through the rumen. Such products are known as rumen bypass products. The alkaline earth metal salt is not very palatable to the ruminant. The feed product of this prior art, however, functions as a rumen bypass composition. Thus, the propionate gluconeogenic ingredient is not available to the rumen or rumen microbes for digestion, fermentation, or metabolization.

Ferré, P., Pegorier, J. P., Marliss, E. B. and Girard, J. R. disclose that orally feeding fat and injecting gluconeogenic substrates to starved, neonatal rats reverses hypoglycaemia (Am. J. Physiol. 234(2): E129–136). The use of injection makes such a treatment onerous for treating larger animals. Unlike cows, starved neonatal rats do not have energy stores to mobilize, thus, the complications with treating cows are not evident.

It is desirable to be able to treat or prevent an energy imbalance disorder, such as ketosis, by providing gluconeogenic precursors in the rumen and by bypassing lipogenic nutrients through the rumen and into the lower digestive tract for absorption as chylomicrons, thereby providing an improved treatment over the prior art.

SUMMARY OF THE INVENTION

It has been found that an unexpected improvement in the treatment or prevention of energy imbalance results by treating the ruminant with a feed supplement comprising a gluconeogenic compound and a hydrogenated fatty acid, wherein the gluconeogenic compound is available for digestion in the rumen, and the hydrogenated fatty acid is rumen inert and will be digested in the abomasum.

The disadvantages of the prior art may be overcome by a feed supplement for ruminants comprising a gluconeogenic compound and a hydrogenated fatty acid to provide a palatable feedstuff for ruminants as a dietary supplement for the treatment or prevention of an energy imbalance.

In its broad aspect, the feed supplement for ruminants comprises an effective amount of a gluconeogenic compound and a hydrogenated fatty acid. The term "effective" as used herein means any amount that is effective to treat or prevent an energy imbalance. In a preferred embodiment, the feed supplement of the invention comprises 10%–40% gluconeogenic compound and 10%–40% $C_{14}$–$C_{22}$ hydrogenated fatty add (all percentages are by weight of total product). The balance of the feed supplement is an inert compound, such as a carrier such as alfalfa or other feedstuffs. The feed supplement can also include flavour agents.

In one example of the present invention, the feed supplement for ruminants comprises about a 30% gluconeogenic compound by weight, and about a 30% $C_{14}$–$C_{22}$ hydrogenated fatty acid by weight, the balance essentially an inert compound. In the preferred embodiment, the gluconeogenic compound is a mixture of propylene glycol, sodium propionate and lactose and the fatty acid is a triglyceride.

In its broad aspect, the method of treating or preventing an energy imbalance in ruminants comprises administering to a ruminant in need thereof, a daily dosage amount of a composition comprising a gluconeogenic compound, which can be digested in the rumen and a hydrogenated fatty add, which is rumen inert. The daily dosage is first administered from about 10–21 days prior to calving to about 21–42 days after calving.

In a preferred method, the daily dosage amount is from 0.5 pounds (0.23 kg) to 2 pounds (0.91 kg) per animal and in a further preferred method the daily dosage amount is 1 pound per animal.

The energy balance, that the feed supplement and method of the present invention is directed, includes, but is not restricted to, the following disease states: ketosis and retained placenta in cattle.

The composition and method of the invention provides a number of advantages including the following:

1. Dietary fat is presented to the energy deficit tissues without involving the liver which helps provide for the overall energy needs of the tissue and tends to lessen the hormone signals triggering fat mobilization.
2. Less mobilized fat reduces the flooding of the liver with fat and lowered ketone production results.
3. Gluconeogenic precursors provided by the composition of the invention augment the production of glucose.
4. The preceding benefits (direct energy to the tissue; less fat sent to the liver and therefore less ketones; more gluconeogenesis, therefore still more glucose for the tissues) combine synergistically to prevent malaise and appetite loss.
5. With the foregoing benefits, the dam "feels better" by virtue of the elimination of negative circumstances.
6. By feeling better, and with the prevention of a depressed appetite, the dam eats more. Greater dry matter intake further addresses her energy shortage in a positive way.
7. The feeding of the composition to ruminants results in not only a prevention of production losses, but enables higher production than normal.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENT

Figure 2:
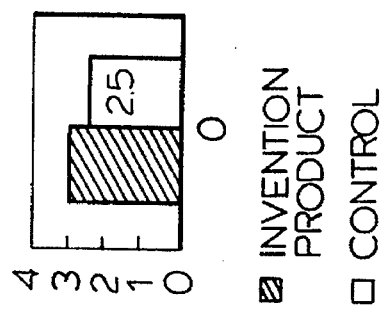
FIG. 2 is a chart of the average body condition score of test cows of FIG. 1 given the preferred composition of the invention in accordance with the method of the invention compared to the average historical body condition score of control cows.

The feed supplement product is added to the feed for ruminants. The composition includes a gluconeogenic compound as well as a hydrogenated fatty acid, which allows for simultaneous treatment of the two potential causes of energy imbalance, specifically low sugar or low fat relative to sugar.

The addition of the gluconeogenic compounds addresses the cause of the glucose shortage theory by providing a compound which is absorbed by the rumen and processed into glucose by the liver. Examples of suitable gluconeogenic compounds are selected from propionic acid, propionic acid ester, propionic acid salt, propyl ester, propyl alcohol, propylene glycol, alanine or any other amino acids pertinent in energy metabolism, sodium propionate, lactate, glycerol, serine, glutamine and other gluconeogenic compounds which are well known in the art, and mixtures thereof.

The simultaneous addition of $C_{14}$–$C_{22}$ fatty acids, preferably hydrogenated fatty acids, provides lipogenic nutrients which addresses the second theory of the cause of ketosis. The hydrogenated fatty acids are rumen inert and therefore pass through the rumen and to the lower digestive tract for absorption. By "rumen inert" it is meant that the hydrogenated fatty acids pass through the rumen and further that they do not interfere with the rumen activity, thus ensuring that the gluconeogenic material is available to the rumen. There are numerous examples in art of rumen bypass products which contain a saturated (or hydrogenated) fatty acid, which is rumen inert. The fatty acids used according to the present invention are saturated straight or branched, unsubstituted or substituted aliphatic mono-carboxylic acids having 14 or more carbon atoms in the molecule (herein referred to generally by the term "fatty acid"), or mixtures of these acids with unsaturated analogs thereof. The upper limit on the number of carbons is not critical, however, straight chains containing 14 to 22 carbon atoms are preferred. Branched chain fatty acids and acids containing up to 30 or more carbon units can also be used according to the present invention.

"Saturated" fatty acids have been defined in the art as having an iodine value in the range of 50. "Highly saturated" fatty acids have been defined as denoting a product that has been chemically altered by being saturated or hydrogenated to form a fat or fatty acid within an iodine value of 35 or less. Both saturated and highly saturated fatty acids can be used according to the present invention. A saturated or highly saturated fat in triglyceride form apparently insulates the microbes from the effects of the fatty acids and passes the fatty acid to other parts of a cow's digestive system. It has been found that many natural fats can be saturated (or hydrogenated) to the extent that the iodine value is less than 35. However, economic studies show that saturated fats such as tallow, lard and grease are already low in the iodine value, and therefore, are cheap to saturate. Such fats also have cheaper raw material costs than the saturated or highly unsaturated fats such as soybean or corn seed oil.

Thus, suitable fatty acids which can be used according to the present invention include hydrogenated $C_{14}$–$C_{22}$ fatty acids, including triglycerides derived from beef and mutton tallow, lard, cotton seed oil, palm seed oil, in addition to other naturally occurring oils, well known in the art, and mixtures thereof.

It has been found that the simultaneous addition of gluconeogenic compounds which are available to the rumen for digestion and fatty acids, which are rumen inert, through a feed supplement comprising both compounds enables ruminants to recover relatively quickly from an energy imbalance. There appears to be a synergistic effect and easily measured benefit to the combining of gluconeogenic substances and fat in a dietary supplement. The use of such a supplement show increased dry matter intake, less loss of body weight, greater milk yield and lower blood ketones.

In one embodiment of the present invention the feed supplement of the invention comprises from 10%–40% gluconeogenic component and 10%–40% $C_{14}$–$C_{22}$ hydrogenated fatty acid (all percentages are by weight of total product), with the balance of the feed supplement a suitable carrier. For example, the inert carrier could comprise approximately 10%–40% protein product and 0%–10% additional flavour enhancer.

In one embodiment of the present invention, the feedstuffs for ruminants comprises equal quantifies of the gluconeogenic compound and the hydrogenated fatty acid. In one example of this embodiment of the present invention, 30% gluconeogenic compound together with 30% $C_{14}$–$C_{22}$ hydrogenated fatty acid were prepared with the balance of the feedstuff being an inert carrier. In this example of the present invention, the inert carrier can be alfalfa, legume hay, grass hay, corn silage, grass silage, legume silage, corn grain, oats, barley, distiller's grain, brewer's grain, soya bean meal, corn seed meal, or some other feedstuff with an additional flavour enhancer added to the feed supplement and mixtures thereof. The flavour enhancer may be anise or some other flavour enhancer known in the art. For example, the inert carrier could comprise approximately 30% alfalfa and 10% flavour (all percentages are by weight of total product).

In a further embodiment of the present invention, the feed supplement for ruminants comprises 30.5% gluconeogenic compound, 30% hydrogenated fatty add, 39.49% alfalfa, and 0.01% flavour, wherein the gluconeogenic compounds are 13% propylene glycol, 7.5% sodium propionate and 10% lactose and the 30% hydrogenated fatty acid is a triglyceride.

The preferred method for treating or preventing an energy imbalance in ruminants comprises orally feeding said ruminant the composition in a daily dosage amount from 10–21 days prior to calving to 20–42 days after calving. The composition of the invention is fed to the ruminant as a supplement to the ruminant's feed. The daily dosage is preferably 0.5 pounds (0.23 kg) to 2 pounds (0.91 kg) by weight of the combined mixture of feed per animal. The daily dosage can be varied throughout the administration period, as needed. In the preferred method, the daily dosage amount is 1 pound per animal.

The following examples are included to further illustrate the invention herein described and claimed. The examples are not intended as limitations of the present invention. The examples show that cows fed the test product ate more, produced more milk, lost less body weight and experienced less clinical and/or sub-clinical ketosis.

EXAMPLES

Figure 1:
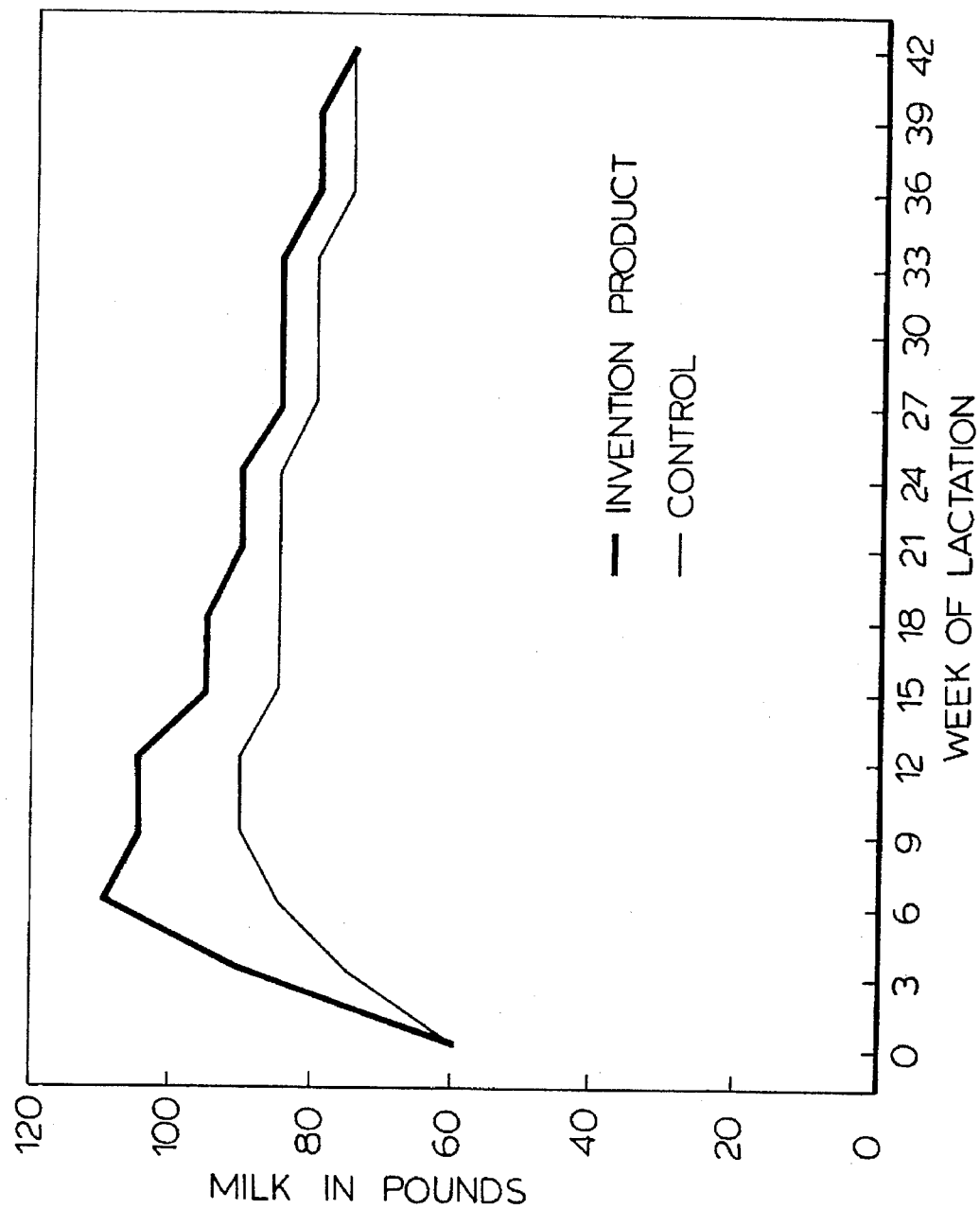
FIG. 1 is a chart of the comparison of milk production of cows fed the preferred composition of the invention in accordance with the method of the invention compared to historical milk production of the herd.

The composition of the invention tested comprised 30.5% gluconeogenic compounds, namely 13% propylene glycol, 7.5% sodium propionate, 10% lactose; 30% hydrogenated fatty acids namely a triglyceride; 39.49% alfalfa; and 0.01% flavour (the "test product"). The test product was fed for 10 days prior to calving to 20 days post calving at a rate of 1 pound/head/day. The amount of milk produced by cows during a lactation period of 42 weeks is shown in FIG. 1. Calving occurred at week 0. The control line refers to the historical data of the group of cows not administered the test product. The cows fed the test product produced 3000 pounds more milk and lost less body weight. The milk production response greatly exceeded what would have been predicted from the feeding of one pound of the test product, based on its caloric and nutrient profile. Thus, the composition of the present invention interacts synergistically in the animal to yield a response greater than any one of its components. The feeding of fat alone typically results in a two to four pounds increase. Propylene glycol and/or sodium propionate alone has only served intermittently to restore failing milk production, never to increase normal milk production.

FIG. 2 shows the body condition score, which is a measurement of weight loss, of the cows fed the test product compared to the historical body condition score of control cows. At the 21-day post calving date, cows fed the test product had a body condition score of 3.0 compared to their historical score of 2.5. This further demonstrates the synergism of the composition of the present invention. Increased milk production, if it could have been achieved, would invariably result in weight loss. Whereas the use of the composition of the present invention resulted in increased milk production and less loss of body condition.

In addition, this herd historically experienced an incidence rate of clinical ketosis between 25% and 30%. Since administering the test product, the herd has experienced less than 2% clinical ketosis.

Table 1 lists a second lactation trial. The test product was fed at 1 pound per head per day from 10 days pre-calving to 21 days post calving. The cows were compared to contemporary herdmates and themselves in prior lactation. All cows fed the test product were in their third or greater lactation in the current lactation, thus prior lactation was not their first lactation. Thus, the normal increase seen in a cow's second lactation compared to the first is not an issue in the present trial. Table 1 shows the pounds of 3.5% fat corrected milk production for cows fed the test product in the current lactation (Group 1) compared to themselves from a prior lactation, not fed the test product (Group 2), and compared to herdmates in the current lactation period, not fed the test product (Group 3). An increase in milk production is clearly evident. The cows fed the test product could be bred again 66 days after calving, while the herdmates not fed the product could be bred again 77 days after calving. The result of the cows giving more milk and showing estrus sooner is again indicative of greatly improved energy status of cows fed the test product. Comparing the sixty-day lactation yields from cows in groups 1 and 3, an increase in milk production is clearly evident. In particular, there was an increase of 19 pounds of milk (3.5% fat corrected) for group 3 compared to group 1. To achieve this result by conventional means, would certainly result in delayed breeding.

TABLE 1

|  | Day of Lactation | |
|---|---|---|
|  | 30 | 60 |
| 1. Cows fed test product in current lactation (n[1] = 27) | 97[2] | 108 |
| 2. Cows of group 1 above, their prior lactation, not fed the test product (n = 27) | 94 | 84 |
| 3. Herdmates of the current lactation, not fed the test product (n = 550) | 95 | 89 |

[1]Denotes the number of cows tested
[2]Pounds of 3.5% fat corrected milk

A study of blood titers of beta-hydroxybutyrate (the primary ketone body indicative of ketosis and energy crisis) in cows fed the test product, as described above, and for control cows, is shown in Table 2. The data show a strong tendency ($p<11$) for the cows fed the invention product to have lower blood levels of this ketone body. On day 1, the difference was significant ($p<05$). All cows showed similar levels prior to testing.

TABLE 2

| | DAY OF LACTATION | | | |
|---|---|---|---|---|
| Cow # | −10 | 1 | 5 | 10 |
| Control | | | | |
| 2989 | 1.150 | 1.648 | 1.005 | 1.384 |
| 3349 | 1.196 | 1.169 | 0.924 | 1.049 |
| 3261 | 1.360 | 1.244 | 2.346 | 1.180 |
| 3291 | 1.084 | 1.157 | 1.304 | 1.094 |
| 3357 | 1.550 | 1.225 | 1.602 | 0.924 |
| 2948 | 1.154 | 1.058 | 1.094 | 1.341 |
| 3276 | 0.671 | 1.018 | 1.379 | 1.057 |
| 3351 | 1.052 | 1.643 | 2.675 | 2.796 |
| 3355 | 0.992 | 1.062 | 1.161 | 0.781 |
| 2741 | 0.857 | 1.613 | 2.208 | 1.442 |
| Mean | 1.107 | 1.284 | 1.570 | 1.305 |
| SE | 0.078 | 0.080 | 0.196 | 0.178 |
| Treatment | | | | |
| 2947 | 1.266 | 0.925 | 0.723 | 0.773 |
| 3300 | 0.883 | 0.745 | 0.673 | 0.851 |
| 2697 | 0.700 | 0.704 | 0.714 | 0.654 |
| 2985 | 1.005 | 1.187 | 1.020 | 0.901 |
| 3368 | 0.943 | 0.919 | 1.934 | 1.292 |
| 3318 | 1.452 | 1.236 | 2.358 | 1.281 |
| 3375 | 1.106 | 0.999 | 1.106 | 1.136 |
| 2570 | 1.279 | 1.499 | 1.453 | 0.915 |
| 3014 | 1.466 | 2.084 | | |
| 1642 | 1.632 | | | |
| Mean | 1.079 | 1.027 | 1.248 | 0.975 |
| SE | 0.087 | 0.094 | 0.220 | 0.083 |

In addition to lower blood ketone levels, cows fed the invention product produced more milk (Table 3). This too, points to the invention's effectiveness, as high milk production is associated with an increased likelihood of ketosis. All cows began this trial in identical body condition, but by 30 days of producing milk, the cows fed the invention product were in slightly better condition despite producing more milk.

TABLE 3

| Day Post-Calving | Control (n = 20) | Treatment (n = 20) | Difference |
| --- | --- | --- | --- |
| 0 | 55 | 60 | +5 |
| 1 | 56 | 55 | −1 |
| 2 | 68 | 68 | 0 |
| 3 | 68 | 75 | +8 |
| 4 | 75 | 74 | −1 |
| 5 | 70 | 78 | +8 |
| 6 | 70 | 80 | +4 |
| 7 | 76 | 80 | +4 |
| 8 | 75 | 81 | +6 |
| 9 | 78 | 88 | +10 |
| 10 | 79 | 90 | +11 |
| 11 | 80 | 90 | +10 |
| 12 | 81 | 90 | +9 |
| 13 | 82 | 92 | +10 |

Conflicting information and research confuse efforts to help the dam as she nears full term and birthing. Some nutritionists advocate "steaming up" for the near term dry cow, effectively increasing nutrient density and dry matter intake, if possible before calving. This is complicated by the observed problem of cattle going off their feed as calving approaches regardless of diet energy density. Cows fed the test product of the present invention do not go off their feed. It was observed that cows in the process of birthing were actively feeding. This is unprecedented in dairy science. Data collected on dry matter intake show that cows fed the test product are eating 47 pounds of dry matter 21 days postpartum, while control cows are eating 42 pounds. This five-pound increase is very useful addition to energy intake, in and of itself, but it is submitted that it is just one manifestation of the benefits of the composition of the present invention, as it is also partitioning this energy more efficiently.

In summary, fat feeding results in minor improvement of animal performance. Glucose precursors can ameliorate ketosis temporarily. The composition of the invention, using both concepts simultaneously, results in significant improvement in animal performance and eliminates the need for therapeutic treatment of clinical ketosis signs.

All scientific publications and patent documents are incorporated herein by reference.

It will be understood that modifications can be made in the embodiments of the invention herein without departing from the scope and purview of the invention as described in the appended claims.

We claim:

1. A feed supplement for ruminants effective to treat or prevent a nutrient imbalance comprising
   (a) from about 10% to 40% by weight of a gluconeogenic compound, which is available for digestion in the rumen, said gluconeogenic compound comprising a compound selected from the group consisting of propionic acid, propionic acid esters, propionic acid salts, propyl ester, propyl alcohol, propylene glycol, glutamine, alanine, serine, lactate, lactose, glycerol and mixtures thereof,
   (b) from about 10% to 40% by weight of a triglyceride of a $C_{14}$–$C_{22}$ hydrogenated fatty acid, which is rumen inert, and
   (c) the balance of said supplement being essentially inert compounds selected from the group consisting of alfalfa, legume hay, grass hay, corn silage, grass silage, legume silage, corn grain, oats, barley, distiller's grain, brewer's grain, soya bean meal, corn seed meal and mixtures thereof.

2. A feed supplement for ruminants as claimed in claim 1 wherein said hydrogenated fatty acid is derived from beef tallow, mutton tallow, lard, cotton seed oil, palm seed oil, natural fat and mixtures thereof.

3. A feed supplement for ruminants as claimed in claim 1 wherein said gluconeogenic compound comprises an admixture of propionic acid salt and propylene glycol.

4. A feed supplement for ruminants as claimed in claim 1 wherein said gluconeogenic compound comprises an admixture of sodium propionate, propylene glycol and lactose.

5. A feed supplement for ruminants as claimed in claim 1, comprising about 7.5% sodium propionate by weight, about 13% propylene glycol by weight, about 10% lactose by weight, about 30% triglyceride by weight, and about 39.5% by weight of essentially inert compounds.

6. A feed supplement for ruminants as claimed in claim 1 wherein said inert compound is alfalfa.

7. A feed supplement for ruminants as claimed in claim 1 wherein said inert compound further comprises a flavour enhancer.

8. A feed supplement for ruminants as claimed in claim 1 wherein said gluconeogenic compound comprises an admixture of sodium propionate, propylene glycol and lactose, said hydrogenated fatty acid comprises triglyceride, and said inert compound comprises alfalfa.

9. A method of treating or preventing a nutrient imbalance in a ruminant comprising administering to said ruminant a sufficient amount of a composition comprising
   (a) from about 10% to 40% by weight of a gluconeogenic compound, which is available for digestion in the rumen, said gluconeogenic compound comprising a compound selected from the group consisting of propionic acid, propionic acid esters, propionic acid salts, propyl ester, propyl alcohol, propylene glycol, glutamine, alanine, serine, lactate, lactose, glycerol and mixtures thereof,
   (b) from about 10% to 40% by weight of a triglyceride of a $C_{14}$–$C_{22}$ hydrogenated fatty acid, which is rumen inert, and
   (c) the balance of said supplement being essentially inert compounds selected from the group consisting of alfalfa, legume hay, grass hay, corn silage, grass silage, legume silage, corn grain, oats, barley, distiller's grain, brewer's grain, soya bean meal, corn seed meal and mixtures thereof.

10. A method of treating or preventing a nutrient imbalance in a ruminant as claimed in claim 9 wherein said hydrogenated fatty acid is derived from beef tallow, mutton tallow, lard, cotton seed oil, palm seed oil, natural fat and mixtures thereof.

11. A method of treating or preventing a nutrient imbalance in a ruminant as claimed in claim 9 wherein said gluconeogenic compound comprises an admixture of propionic acid salt and propylene glycol.

12. A method of treating or preventing a nutrient imbalance in a ruminant as claimed in claim 9 wherein said gluconeogenic compound comprises an admixture of sodium propionate, propylene glycol and lactose.

13. A method of treating or preventing a nutrient imbalance in a ruminant as claimed in claim 9 wherein said composition comprises about 7.5% sodium propionate by weight, about 13% propylene glycol by weight, about 10% lactose by weight, about 30% triglyceride by weight, and about 39.5% by weight of essentially inert compounds.

14. A method of treating or preventing a nutrient imbalance in a ruminant as claimed in claim 9 wherein said inert compound is alfalfa.

15. A method of treating or preventing a nutrient imbalance in a ruminant as claimed in claim 9 wherein said inert compound further comprises a flavour enhancer.

16. A method of treating or preventing a nutrient imbalance in a ruminant as claimed in claim 9 wherein a daily dosage amount of said composition is administered to said ruminant from within 10–21 days prior to calving to within 21–42 days after calving.

17. A method of treating or preventing a nutrient imbalance in a ruminant as claimed in claim 16 wherein said daily dosage is 0.5 pounds to 2 pounds per ruminant.

18. A method of treating or preventing a nutrient imbalance in a ruminant as claimed in claim 17 wherein said daily dosage is 1.0 pound per ruminant.

* * * * *